(12) United States Patent
Yamashita

(10) Patent No.: US 7,967,919 B2
(45) Date of Patent: Jun. 28, 2011

(54) PROCESS FOR PRODUCING SELF-ASSEMBLED RARE EARTH-IRON BONDED MAGNET AND MOTOR UTILIZING THE SAME

(75) Inventor: Fumitoshi Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 11/597,624

(22) PCT Filed: May 26, 2005

(86) PCT No.: PCT/JP2005/009642
§ 371 (c)(1),
(2), (4) Date: Nov. 27, 2006

(87) PCT Pub. No.: WO2005/124795
PCT Pub. Date: Dec. 29, 2005

(65) Prior Publication Data
US 2007/0228845 A1    Oct. 4, 2007

(30) Foreign Application Priority Data
Jun. 17, 2004   (JP) .................................. 2004-179255

(51) Int. Cl.
*H01F 1/053* (2006.01)
*H01F 1/08* (2006.01)
(52) U.S. Cl. ..................................... 148/101; 252/62.54
(58) Field of Classification Search ......................... None
See application file for complete search history.

(56) References Cited

U.S. PATENT DOCUMENTS

| | | | |
|---|---|---|---|
| 6,387,294 B1 * | 5/2002 | Yamashita et al. | 252/62.54 |
| 7,381,280 B2 * | 6/2008 | Yamashita | 148/104 |
| 2001/0002276 A1 | 5/2001 | Yamashita | |

(Continued)

FOREIGN PATENT DOCUMENTS

JP    57-170501 A    10/1982
(Continued)

OTHER PUBLICATIONS

The Condensed Chemical Dictionary, 8th Edition, 1971, pp. 644 and 729.*

(Continued)

*Primary Examiner* — John P Sheehan
(74) *Attorney, Agent, or Firm* — McDermott Will & Emery LLP

(57) ABSTRACT

The present invention provides a method for manufacturing a self-organized rare earth-iron bonded magnet, including: a first step of covering a rare earth-iron magnet powder with oligomer or prepolymer in which one molecule includes at least two or more reactive ground substances to provide a surface-treated magnet powder; a second step of melting and kneading stretchable polymer and the surface-treated magnet powder to coarsely crush the resultant material to provide a granule; a third step of dry blending the granule with hardener to provide a compound; a fourth step of compressing the compound under temperature conditions by which the oligomer or prepolymer, the polymer, and the hardener are caused to melt and to flow to provide a green compact; a fifth step of causing the green compact to be a self-organized rare earth-iron bonded magnet by reacting the oligomer or prepolymer, and polymer with the hardener; and a sixth step of stretching the bonded magnet to transform the shape to any of a circular-shape or a circular arc-like shape.

30 Claims, 9 Drawing Sheets

U.S. PATENT DOCUMENTS

2005/0076974 A1  4/2005  Honkura et al.
2005/0081961 A1  4/2005  Yamashita

FOREIGN PATENT DOCUMENTS

| | | |
|---|---|---|
| JP | 6-132107 | 5/1994 |
| JP | 8-138923 | 5/1996 |
| JP | 9-165502 A | 6/1997 |
| JP | 11-265812 A | 9/1999 |
| JP | 2003-189560 A | 7/2003 |
| JP | 2004-47872 A | 2/2004 |
| JP | 2005-116991 A | 4/2005 |
| WO | WO 03/085684 A1 | 10/2003 |
| WO | WO 03/092021 A1 | 11/2003 |

OTHER PUBLICATIONS

European Search Report issued in European Patent Application No. EP 05 74 3724, mailed Oct. 30, 2007.

* cited by examiner

PROCESS FOR PRODUCING SELF-ASSEMBLED RARE EARTH-IRON BONDED MAGNET AND MOTOR UTILIZING THE SAME

RELATED APPLICATIONS

This application is the U.S. National Phase under 35 U.S.C. §371 of International Application No. PCT/JP2005/009642, filed on May 26, 2005, which in turn claims the benefit of Japanese Application No. 2004-179255, filed on Jun. 17, 2004, the disclosures of which Applications are incorporated by reference herein.

TECHNICAL FIELD

The present invention relates to a method for manufacturing an anisotropic rare earth-iron bonded magnet provided in a brushless motor or a DC motor and a small motor using the same.

BACKGROUND ART

Representative rare earth-iron magnets include two types magnets of a sintered magnet and a rapidly-quenched magnet by the melt spinning method. Among them, an isotropic rare earth-iron bonded magnet (hereinafter referred to as bonded magnet) using a rapidly-quenched magnet has been widely used as a small diameter magnet for various small high-performance motors used as a driving source for OA, AV, PC, and the peripheral device thereof and information/communication devices. On the other hand, small magnet motors having further smaller size, lighter weight, and higher output have been increasingly required by the recent more sophisticated and high value-added electric and electronic devices. In order to satisfy this requirement, anisotropic bonded magnets have been developed actively and an anisotropic bonded magnet having the maximum energy product (hereinafter referred to as MEP) of 150 kJ/m$^3$ has been achieved. Furthermore, an anisotropic rare earth-iron magnet powder (hereinafter also referred to as magnet powder) having a superior thermostability and coercitivity $H_{CJ}$ of 1.20 MA/m or more also has been developed. However, a bonded magnet using the above anisotropic magnet powder and having a high MEP is manufactured by a cylindrical column or a cube-like shape and is actually rarely used for general small motors. The reason is that, a magnet provided in a small motor, which is covered by the present invention, requires a shape that is not a simple cylindrical column or cube-like shape but a circular shape having a diameter of 25 mm or less for example or a circular arc-like shape having a thickness of 1 mm or less. The above circular magnet also requires a radially-anisotropic bonded magnet being magnetic anisotropic in the radial direction. A means for generating the radial orientation magnetic field as described above is disclosed by Japanese Patent Unexamined Publication No. S57-170501. Specifically, the method uses a forming die in which a magnetic material yoke and a non-magnetic material yoke are alternately combined to surround a circular forming die cavity and an exciting coil is positioned at an outer side. This method uses, in order to generate a radial orientation magnetic field having a predetermined strength in the circular forming die cavity, a high voltage and high current-type power source that generates a high magnetomotive force of 170 kAT for example. However, a magnetic path of a magnetic material yoke must be increased in order that a magnetic flux excited from the outer circumference of a circular forming die cavity by a magnetic material yoke is caused to effectively focus in the circular forming die cavity. When the circular forming die cavity has a small diameter (or a long length) in particular, a substantial part of the magnetomotive force is consumed as a leaked magnetic flux. This causes a problem where the circular forming die cavity has a reduced orientation magnetic field. For example, in the case of a circular magnet provided in a small motor that is covered by the present invention and that has a diameter of 25 mm or less, a thickness of 1 to 2 mm, and a ratio between the length and the diameter (L/D) of 0.5 to 1, the magnet powders have a reduced orientation level to cause a reduced MEP of a bonded magnet. Specifically, there is a problem where only a circular-shaped bonded magnet for a motor can be manufactured that has a lower characteristic than that of a bonded magnet having a high MEP manufactured by a cylindrical column or cube shape.

SUMMARY OF THE INVENTION

The present invention provides: a method for manufacturing a self-organized rare earth-iron bonded magnet comprising:
a first step of covering a rare earth-iron magnet powder with oligomer or prepolymer in which one molecule includes at least two or more reactive ground substances to provide a surface-treated magnet powder;
a second step of melting and kneading stretchable polymer and the surface-treated magnet powder with a temperature equal to or higher than a melting point of the polymer to coarsely crush the resultant material to provide a granule;
a third step of dry blending the oligomer or prepolymer, a hardener and the granule to provide a compound, the hardener can react with reactive ground substance of the polymer;
a fourth step of compressing the compound under conditions in which the oligomer or prepolymer, the polymer, and the hardener are caused to melt and to flow at a temperature equal to or higher than the melting points thereof to provide a green compact;
a fifth step of causing the green compact to be a self-organized rare earth-iron bonded magnet by reacting the oligomer or prepolymer, and the polymer with the hardener; and
a sixth step of stretching the self-organized rare earth-iron bonded magnet to transform the shape to a circular-shape or a circular arc-like shape.

The present invention also provides a motor using the bonded magnet.

REFERENCE MARKS IN THE DRAWINGS

Figures 1A, 1B:
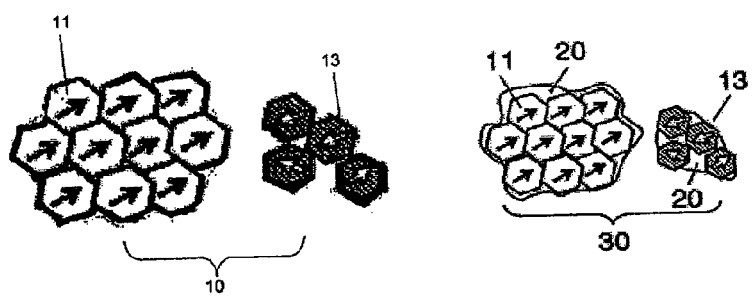
FIG. 1A illustrates a rare earth-iron magnet powder of an embodiment of the present invention.
FIG. 1B illustrates a surface-treated rare earth-iron magnet powder of an embodiment of the present invention.

10 Rare earth-iron magnet powder
11 Anisotropic polycrystalline aggregate-type $Nd_2Fe_{14}B$ powder
13 Magnetically-anisotropic and single domain particle-type $Sm_2Fe_{17}N_3$ fine powder
20 Oligomer or prepolymer
21 Stretchable polymer
22 Hardener
23 Additive agent
30 Surface-treated magnet powder
31 Granule
32 Compound
33 Green compact
34 Self-organized bonded magnet

DETAILED DESCRIPTION OF PREFERRED EMBODIMENTS

The present invention provides a high performance bonded magnet that prevents the MEP (the maximum energy product) from being reduced even when an anisotropic rare earth-iron magnet powder (hereinafter also referred to as magnet powder) is used to provide a small diameter and the manufacture method thereof, and a small motor using the bonded magnet.

Recent electric and electronic devices can have a higher performance if the above-described bonded magnet that can be applied to a small motor, that has an arbitrary circular or circular arc shape, and that has a high MEP (e.g., 160 kJ/m³ or more) can be produced easily. Specifically, the bonded magnet as described above can provide a new small motor having a high output and realizing power saving. The reason will be described below. A conventional isotropic bonded magnet has MEP of substantially 80 kJ/m³. In contrast with this, if a bonded magnet that has an arbitrary circular or circular arc shape and that has a high MEP equal to or higher than 160 kJ/m³ can be manufactured, a magnetic flux density of a space between a motor magnet and an iron core will be substantially a square root of the proportion of the MEP. Thus, although the result may be different depending on a design concept of the small motor, about 1.4 times higher output and 30% smaller size can be achieved.

The manufacture method of the self-organized bonded magnet for a small motor of the present invention as described above by which various magnet shapes from the circular one to the circular-arc one and a magnetic characteristic can be both realized has the following steps.

This manufacture method comprises: the first step of covering anisotropic magnet powders 10 with oligomer or prepolymer 20 in which one molecule includes at least two or more reactive ground substances to provide surface-treated magnet powder 30; the second step of melting and kneading polymer 21 and surface-treated magnet powder 30 at a temperature equal to or higher than a melting point of stretchable polymer 21 to coarsely crush polymer 21 and surface-treated magnet powder 30 to provide granule 31; the third step of dry blending granule 31 with hardener 22 and additive agent 23 appropriately added as required to provide compound 32, hardener 22 can react with reactive ground substance of oligomer or prepolymer 20, and polymer 21; the fourth step of compressing compound 32 under melt/flow conditions equal to or higher than the melting point of polymer 21 to provide green compact 33; the fifth step of causing binder 20 and polymer 21 of green compact 33 to react with hardener 22 to provide self-organized bonded magnet 34; and the sixth step of stretching bonded magnet 34 to use the flexibility appearing in the stretch direction to subject bonded magnet 34 to a shape transformation to a circular or circular arc shape.

Specifically, lubricant is simultaneously melted and kneaded with polymer 21 and surface-treated magnet powder 30 in the second step and these materials are coarsely crushed to provide granule 31. When pentaerythritol C17 triester (hereinafter referred to as PETE) is used as lubricant and is added in an amount of 3 to 15 parts by weight to 100 parts by weight of polymer 21 in particular, a slip flow phenomenon appears when a temperature equal to or higher than the melting point of polymer 21 is reached. When this is used to compress compound 32 with a temperature equal to or higher than the melting points of oligomer or prepolymer 20, polymer 21, and hardener 22, then a high MEP self-organized bonded magnet can be manufactured that is based on an extremely low pressure molding of 25 to 50 MPa. Furthermore, the anisotropic direction can be provided in a perpendicular direction or in an in-plane direction. Thus, the magnet flexibility can be controlled by stretching polymer 21 to provide a magnetic field system of a high performance permanent magnet-type motor having various shapes ranging from the circular one to the circular arc-like one and having various magnetic circuit configurations.

Hereinafter, the present invention will be described in detail with reference to the drawings. It is noted that the drawings are schematic diagrams that do not illustrate the respective positional relations with an actual size. First, a method for manufacturing a self-organized bonded magnet having a high MEP will be described.

FIG. 1A illustrates rare earth-iron magnet powder 10 and FIG. 1B illustrates surface-treated magnet powder 30 obtained by covering magnet powder 10 with oligomer or prepolymer 20 in which one molecule includes at least two or more reactive ground substances. In FIG. 1A and FIG. 1B, the arrows show magnetization easy axes (C axes) of magnetically-anisotropic and polycrystalline aggregate-type $Nd_2Fe_{14}B$ powder 11 and magnetically-anisotropic and single domain particle-type $Sm_2Fe_{17}N_3$ fine powder 13, respectively. It is noted that magnetically-anisotropic and polycrystalline aggregate-type $Nd_2Fe_{14}B$ powder 11 and magnetically-anisotropic and single domain particle-type $Sm_2Fe_{17}N_3$ fine powder 13 have average particle diameters of 50 μm or more and about 3 μm, respectively, and have different specific surface areas, respectively. Thus, magnetically-anisotropic and polycrystalline aggregate-type $Nd_2Fe_{14}B$ powder 11 and magnetically-anisotropic and single domain particle-type $Sm_2Fe_{17}N_3$ fine powder 13 are preferably formed in separate steps for surface-treated magnet powder 30 so that oligomer or prepolymer 20 is prevented from covering them excessively. Polycrystalline aggregate-type $Nd_2Fe_{14}B$ powder 11 according to the present invention as described above may be a polycrystalline aggregate-type $Nd_2Fe_{14}B$ powder prepared by Die-Up-Setting or a polycrystalline aggregate-type $Nd_2Fe_{14}B$ powders prepared by HDDR processing (Hydrogenation-Decomposition-Desorpsion-Recombination processing). It is noted that a magnet powder obtained by previously inactivating the surface by photodegraded Zn or the like also may be used. It is noted that polycrystalline aggregate-type $Nd_2Fe_{14}B$ powder 11 preferably has coercivity $H_{CJ}$ at 20° C. after a magnetization by a 4 MA/m pulse magnetization equal to or higher than 1 MA/m.

On the other hand, magnetically-anisotropic single domain particle-type $Sm_2Fe_{17}N_3$ fine powder 13 of the present invention is obtained by using the reduction and diffusion method to manufacture R—Fe-base alloy or R—(Fe, Co)— base alloy, nitriding the alloy and then pulverizing the nitride. The pulverizing operation can be performed by a known technique such as a jet mill, a vibration ball mill, or a rotation ball mill. The nitride is pulverized to have a particle diameter, that is, based on the Fischer average particle diameter, equal to or lower than 1.5 μm and preferably equal to or lower than 1.2 μm. It is noted that the fine powders desirably use, in order to improve a handling ability (e.g., fireproof performance), a known method to have thereon a gradually oxidized film by a wet type or dry type processing. Alternatively, another known method of forming a metal film or an inorganic film also may be used for stabilization. Alternatively, $Sm_2Fe_{17}N_3$ fine powders also may be obtained by combining these stabilization processings.

In the present invention, surface-treated magnet powder 30 is provided by covering the uppermost surface of polycrystalline aggregate-type $Nd_2Fe_{14}B$ powder 11 or single domain particle-type $Sm_2Fe_{17}N_3$ fine powder 13 with oligomer or prepolymer 20. Specifically, polycrystalline aggregate-type $Nd_2Fe_{14}B$ powder 11 or single domain particle-type $Sm_2Fe_{17}N_3$ fine powder 13 and organic solvent solution of oligomer or prepolymer 20 are previously subjected to a wet type mixing, removing the solvent, and crushed and are appropriately classified as required. It is noted that preferable oligomer or prepolymer 20 in the present invention is specifically an organic compound that has a melting point of 70 to 100° C. and that has at least two or more oxirane rings in a molecular chain. Representative compounds include a compound obtained by the reaction between bisphenols and epichlorohydrin or substituted epichlorohydrin. Another compound also may be used such as epoxy oligomer obtained by various methods. Preferably, oligomer or prepolymer 20 in the present invention may be polyglycidyl ether o-cresol novolac-type epoxy oligomer having epoxy of an equivalent weight of 205-220 g/eq and a melting point of 70 to 76° C. (hereinafter referred to as novolac-type epoxy oligomer).

Figure 2:
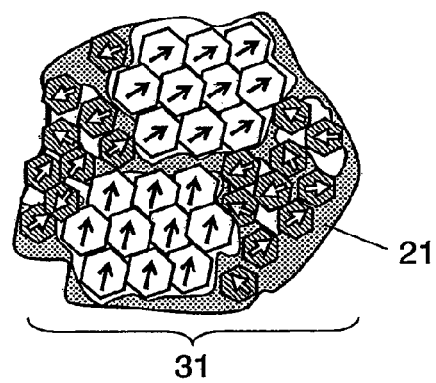
FIG. 2 illustrates a granule of an embodiment of the present invention.

FIG. 2 shows the second step of granule 31 including surface-treated magnet powder 30 as a main component. Surface-treated magnet powder 30 is manufactured by covering the uppermost surface of polycrystalline aggregate-type $Nd_2Fe_{14}B$ powder 11, and single domain particle-type $Sm_2Fe_{17}N_3$ fine powder 13 with oligomer or prepolymer 20. In the second step, the surface-treated magnet powder 30 and polymer 21 are melted and kneaded at a temperature equal to or higher than a melting point of stretchable polymer 21 and then coarsely crushed. Here, granule 31 desirably includes magnet powder 10 using both of polycrystalline aggregate-type $Nd_2Fe_{14}B$ powder 11 and single domain particle-type $Sm_2Fe_{17}N_3$ fine powder 13 as shown in FIG. 2. From a viewpoint of a high MEP and the suppression of an initial irreversible demagnetization, the total sum of polycrystalline aggregate-type $Nd_2Fe_{14}B$ powder 11 and single domain particle-type $Sm_2Fe_{17}N_3$ fine powder 13 in magnet powder 10 is preferably 95 weight percent or more among which a ratio of single domain particle-type $Sm_2Fe_{17}N_3$ fine powder 13 is preferably 40 weight percent or more. It is noted that polymer 21 and surface-treated magnet powder 30 covered with oligomer or prepolymer 20 are melted and kneaded by a kneading machine that can be heated such as a roll mill or a two-axis extruding machine.

It is noted that stretchable polymer 21 of the present invention is preferably polyamide. Polyamides include the one synthesized by lactam or aminocarboxylic acid and the one synthesized by diamine and dicarboxylic acid or the ester or halide. For example, polyamide that can be used in the present invention exemplarily includes crystalline nylon (e.g., nylon 6, nylon 6-6, nylon 6-10, nylon 6-12, nylon 11, nylon 12), noncrystalline nylon, copolymerization nylon, or a blended product for example. Polyamide having a low melting point is more preferable. Specifically, such polyamide may be, for example, polyamide copolymer or alcohol-soluble polyamide having a melting point of 80 to 150° C., an acid number of 10 or less, an amine number of 20 or less, and a molecular weight of 4000 to 12000.

Stretchable polymer 21 as described above can realize a superior adhesive strength while maintaining the reactivity at a low temperature by being subjected, in a manufacture step of self-organized bonded magnet 34 of the present invention, to a softening or melting operation or by dissolving at least a part thereof into epoxy oligomer as oligomer or prepolymer 20. It is noted that the term "low melting point" in this case means a melting point or a softening point at a temperature at which magnet powder 10 is rearranged by the orientation magnetic field (about 80 to 150° C.).

It is noted that lubricant causing a melt flow involved with slippage is preferably simultaneously melted and kneaded in the second step of the present invention to coarsely crush the material to provide granule 31. Lubricant causing a melt flow involved with slippage may be, for example, a compound that provides well matched inner slipping performance to magnet powder 10 and outer slipping performance to a wall surface of a forming die (e.g., pentaerythritol C17 triester (PETE)). PETE is obtained by the condensation reaction between 1 mol of pentaerythritol and 3 mol of stearic acid and has a melting point of about 51° C. It is noted that a melt flow involved with slippage is remarkable when PETE is added in an amount of 3 to 15 parts by weight to 100 parts by weight of polymer 21.

It is noted that, when the percentage of magnet powder 10 in compound 32 is 95 weight percent or more under the above-described conditions causing a sufficient melt flow involved with slippage, the self-organized bonded magnet of the present invention can have a high MEP advantageously.

Figure 3:
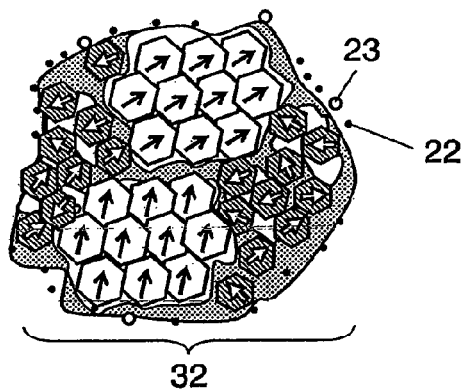
FIG. 3 illustrates a compound of an embodiment of the present invention.

FIG. 3 shows compound 32 obtained by the third step. Specifically, FIG. 3 illustrates the structure of compound 32 obtained by subjecting granule 31 obtained by the second step and hardener 22 to a dry blending. As shown in FIG. 3, hardener 22 is physically attached to the surface of granule 31. It is noted that additive agent 23 also may be added as required in the second step.

Hardener 22 of the present invention exemplarily includes, for example, powder-like latent epoxy resin hardener consisting of hydantoin derivative shown by Chemical Formula 1.

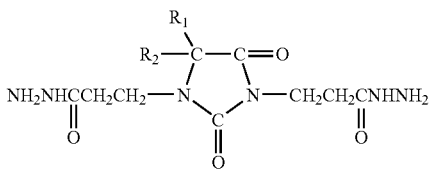

Chemical Formula 1; wherein R1 and R2 represent H or alkyl group. Furthermore, hydrazine derivative or dicyandiamide also can be used.

Figure 4:
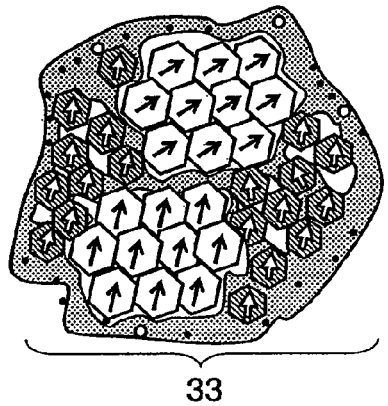
FIG. 4 illustrates a green compact of an embodiment of the present invention.

FIG. 4 illustrates the structure of green compact 33 in the fourth step. Specifically, green compact 33 is obtained by applying an orientation magnetic field to compound 32 obtained by the precedent step while compound 32 being heated with a temperature equal to or higher than the melting point of polymer 21 to rearrange magnet powder 10, and subsequently performing compression with 50 MPa or less.

It is noted that heat conduction from a forming die causes oligomer or prepolymer 20 and stretchable polymer 21 to be melt. As a result, polycrystalline aggregate-type $Nd_2Fe_{14}B$ powder 11 and single domain particle-type $Sm_2Fe_{17}N_3$ fine powder 13 are rearranged so that the magnetization easy axis (C axis) is arranged by the orientation magnetic field in a fixed direction as shown in FIG. 4. Then, compound 32 in this status is compressed with 50 MPa or less to provide magnetically-anisotropic green compact 33. However, the anisotropic direction may be a perpendicular direction or an in-plane direction to a surface of a plate-like magnet. When the anisotropic direction is provided in a direction perpendicular to the surface of the plate-like magnet, compound 32 is desirably compressed in a transverse magnetic field or a parallel magnetic field orientation and, when the anisotropic direction is provided in an in-plane direction, compound 32 is desirably compressed in a transverse magnetic field orientation to provide plate-like green compact 33 having a thickness of 1.5 mm or less. Furthermore, green compact 33 according to the present invention preferably has a relative density of 98% or more. The reason is that, when the green compact 33 has a reduced relative density and when green compact 33 is self-organized while being heated in air, a MEP reduction corresponding to permanent deterioration of magnet powder 10 is increased in accordance with an amount of a space.

It is noted that the present invention manufactures green compact 33 by heating oligomer or prepolymer 20, polymer 21, and lubricant included in compound 32 filled in the forming die cavity with a temperature equal to or higher than the melting points of them and subsequently compressing compound 32 with an orientation magnetic field of 1.4 MA/m or more and a pressure of 100 MPa or less. However, any conditions providing a sufficient slip flow also may be used under which compress compound 32 is subjected to a compression molding with 25 to 50 MPa under an orientation magnetic field of 1 MA/m or higher. Under the low-pressure compression conditions as described above, the forming die does not require a high-cost nonmagnetic cemented carbide and can use a low-cost nonmagnetic stainless for example. Furthermore, a compression forming die having a plurality of cavities and being composed of nonmagnetic material also can be used, thus providing a high productivity.

Figure 5:
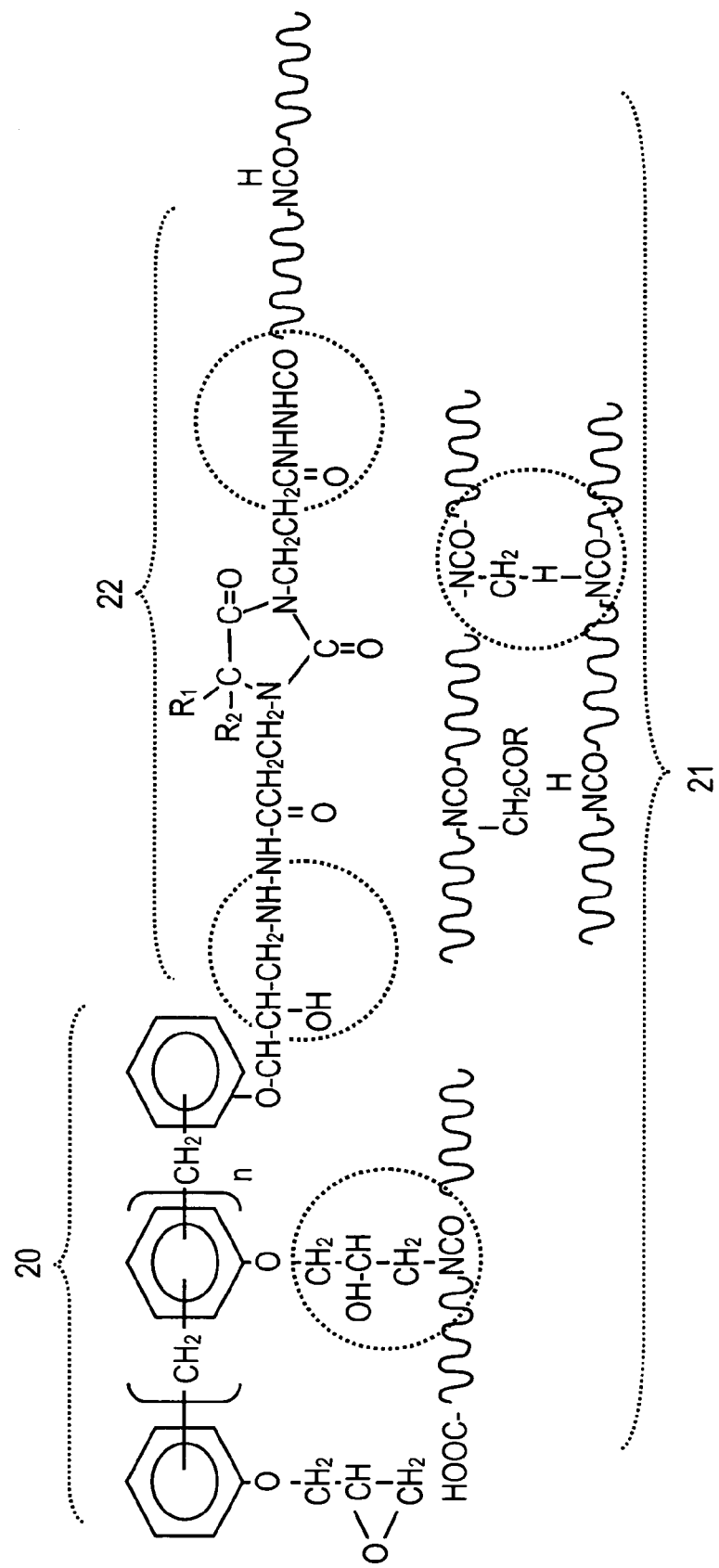
FIG. 5 illustrates a chemical structure of self-organization of an embodiment of the present invention.

FIG. 5 illustrates the chemical structure of self-organized bonded magnet 34 in the fifth step. Specifically, oligomer or prepolymer 20, and polymer 21 in green compact 33 are caused to react with hardener 22. However, oligomer or prepolymer 20 in FIG. 5 has at least two or more organic functional groups in one molecule and covers the surface of magnet powder 10. In this case, novolac-type epoxy oligomer is shown. Stretchable polymer 21 shown in FIG. 5 is polyamide having a carboxyl group at an end. Furthermore, hardener 22 in FIG. 5 is a hydantoin derivative shown in (Chemical Formula 1). As shown in FIG. 5, a functional group of oligomer or prepolymer 20 for fixing magnet powder 10 and a functional group of polymer 21 for providing a molecular chain orientation by stretching react with hardener 22 by heat, respectively. Alternatively, oligomer or prepolymer 20 directly reacts with polymer 21. Then, self-organized bonded magnet 34 is obtained by the reaction thereof. It is noted that hardener 22 as a hydantoin derivative in this example intrudes into oligomer or prepolymer 20 and polymer 21 by being dissolved into oligomer or prepolymer 20 and polymer 21 at a temperature equal to or higher than the melting point thereof, thereby promoting the chemical bond.

It is noted that the fifth step of manufacturing self-organized bonded magnet 34 also may be partially or entirely incorporated into the fourth step of manufacturing green compact 33. Specifically, the self-organization also can be performed while performing the compression in the forming die. In this case, additive agent 23 is preferably additionally used as a catalyst for promoting the self-organization. A bisphenol-type amine compound may be effectively used as the catalyst as described above. Specifically, an aromatic diamine compound such as meta-Phenylenediamine, diaminodiphenylmethane, Diaminodiphenylsulfone, or diaminodiethyldiphenylmethane may be used. The compounds as described above may be added in an amount determined based on the manufacture conditions.

As described above, green compact 33 having a relative density of 98% or more is subjected to the heating and pressurization operations of the fifth step to provide self-organized bonded magnet 34 having a relative density of 98% or more.

Figure 6:
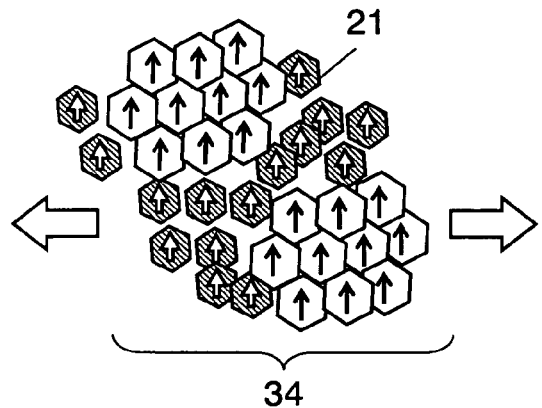
FIG. 6 illustrates a molecular chain orientation of an embodiment of the present invention.

FIG. 6 illustrates self-organized bonded magnet 34 stretched in the direction in the direction shown by the arrows in FIG. 6 so that molecular chains of stretchable polymer 21 are orientated in the stretch direction. The present invention uses the flexibility appearing in the stretch direction as shown in FIG. 6 to subject self-organized bonded magnet 34 to a shape transformation to a circular or circular arc-like shape, thereby providing a desired bonded magnet. Preferable stretch methods include a rolling for providing a circular magnet and a stamping for providing a circular arc-like magnet. Alternatively, the rolling and the stamping also may be both used.

Figure 7A:
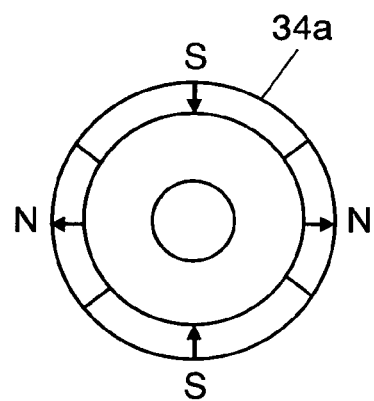
FIG. 7A illustrates a magnetization direction and a shape transformation of a bonded magnet according to an embodiment of the present invention.
Figure 7B:
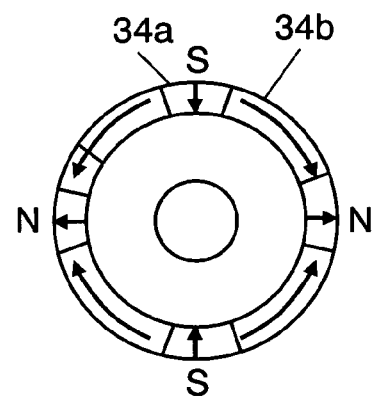
FIG. 7B illustrates a magnetization direction and a shape transformation of a bonded magnet according to an embodiment of the present invention.
Figure 7C:
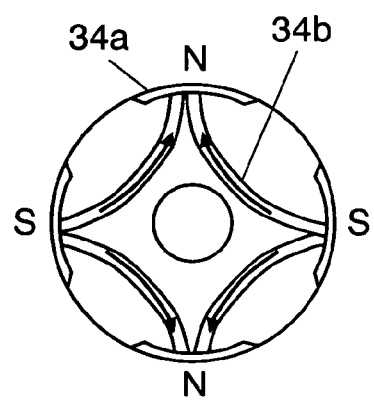
FIG. 7C illustrates a magnetization direction and a shape transformation of a bonded magnet according to an embodiment of the present invention.

FIGS. 7A to 7D illustrate the magnetization direction of self-organized bonded magnet 34 of the present invention and an example of the shape transformation of the magnet. However, FIGS. 7A to 7D exemplarily illustrate the structure of a tetrapolar inner magnet-type rotor. As shown in FIGS. 7A to 7D, radially-anisotropic magnet 34a is anisotropic in the direction perpendicular to the thickness and is subjected to a shape transformation. Anisotropic magnet 34b is anisotropic in the in-plane direction. FIG. 7A is a radially-anisotropic magnet subjected to a shape transformation to a circular shape. FIGS. 7B and 7C exemplarily illustrate the structure appropriately combining a circular arc-like and radially-anisotropic magnet and an in-plane anisotropic magnet. FIG. 7C exemplarily illustrates the structure appropriately combining in-plane anisotropic magnets. Generally, a circular or circular arc-like anisotropic magnet is limited to a magnet that is anisotropic in the thickness direction. However, the present invention can manufacture a magnet, as shown in FIGS. 7B and 7C, that is anisotropic in the circumference direction of the circular arc-like magnet and that has a high permeance coefficient Pc and a high MEP. It is noted that the magnet as described above also may be previously magnetized before being subjected to a shape transformation. Advantages of this magnet can be summarized into the following three advantages 1 to 3 described below with reference to FIG. 7D.

1. A high permeance coefficient Pc higher than that of the one including arranged circular magnets can be realized.
2. The magnet has permeance coefficient Pc that is highest at the pole center and that is gradually lower as a distance from the pole center is increased. Thus, a space to an iron core can have an extremely-high magnetostatic field and higher permeance coefficient Pc proportionally prevents demagnetization.
3. Furthermore, the distribution of the magnetic flux densities in the space to an iron core can have a wave closer to a sinusoidal wave to reduce a cogging torque.

As described above, the self-organized bonded magnet of the present invention can have a MEP of 120 kJ/m$^3$ or more at 20° C. when magnetized at 1.2 MA/m and can have a MEP of 160 kJ/m$^3$ or more at 20° C. when magnetized at 2.0 MA/m. As a result, a radially-anisotropic circular magnet or an in-plane anisotropic circular arc-like magnet as shown in FIG. 7A to FIG. 7D can be converted to various shapes to provide a strong magnetostatic field in a space between a rotor and an iron core. In this manner, a small motor can have a high performance.

Embodiments

Hereinafter, embodiments of the present invention will be described in further detail with regards to the respective items. However, the present invention is not limited to the embodiments.

1. Raw Material

This illustrative embodiment uses magnetically-anisotropic polycrystalline aggregate-type $Nd_2Fe_{14}B$ powder 11 ($Nd_{12.3}Dy_{0.3}Fe_{64.7}CO_{12.3}B_{6.0}Ga_{0.6}Zr_{0.1}$) having an average particle diameter of 80 μm that is prepared by a HDDR processing and magnetically-anisotropic single domain particle-type $Sm_2Fe_{17}N_3$ fine powder 13 having an average particle diameter of 3 μm prepared by the oxidation-reduction (RD) method. Oligomer or prepolymer 20 of the present invention is novolac-type epoxy oligomer having an epoxy equivalent weight of 205-220 g/eq and a melting point of 70 to 76° C.; stretchable polymer 21 is a polyamide powder having a melting point of 80° C., an acid number of 10 or less, an amine number of 20 or less, and a molecular weight of 4000 to 12000; hardener 22 is a latent epoxy resin hardener (hydantoin derivative) that has the structure shown in (Chemical Formula 1), that has an average particle diameter of 3 μm, and that has a melting point of 80 to 100° C.; and lubricant is PETE having a melting point about of 52° C.

It is noted that a comparison example uses a magnetically-isotropic and flake-like powder having an average particle diameter of 70 μm and MEP of 130 kJ/m$^3$ made by the melt spinning method (alloy composition: $Nd_{12}Fe_{77}CO_5B_6$, hereinafter referred to as magnetically-isotropic and flake-like powder) and a magnetically-isotropic massive powder having an average particle diameter of 105 μm and a MEP of 105 kJ/m$^3$ made by the strip cast method (alloy composition: $Nd_{8.7}Fe_{60.5}Co_{2.8}B_{20.2}Ti_{4.6}Nb_{1.2}V_{2.1}$, hereinafter referred to as magnetically-isotropic massive powder).

2. Melt Flow Characteristic

The method for manufacturing a self-organized bonded magnet of the present invention is composed of steps for manufacturing a compound and a bonded magnet. The manufacture steps of the compound are characterized in the following points. Specifically, polycrystalline aggregate-type $Nd_2Fe_{14}B$ powder 11 and single domain particle-type $Sm_2Fe_{17}N_3$ fine powder 13 are respectively subjected to a surface treatment by the minimum necessary amount of oligomer or prepolymer 20 (solid epoxy oligomer) to provide surface-treated magnet powder 30. Then, surface-treated magnet powder 30 and mechanically-stretchable polymer 21 are collectively melted and kneaded so that granule 31 having a melt flow characteristic can be manufactured that is composed of $Nd_2Fe_{14}B$ powder 11, $Sm_2Fe_{17}N_3$ fine powder 13, oligomer or prepolymer 20, and polymer 21. It is noted that granule 31 preferably has a particle diameter of 355 μm or less. Then, hardener 22 and additive agent 23 that is appropriately added as required are attached to the surface of granule 31, thereby providing compound 32.

Specifically, $Nd_2Fe_{14}B$ powder 11 of 60 parts by weight is added to oligomer or prepolymer 20 of 3 parts by weight and $Sm_2Fe_{17}N_3$ fine powder 13 of 40 parts by weight is added to binder 20 of 0.8 parts by weight. Binder 20 is previously provided as acetone solution and is subjected to a wet type mixing with $Nd_2Fe_{14}B$ powder 11 or $Sm_2Fe_{17}N_3$ fine powder 13 and acetone is caused to vaporize at 80° C., thereby obtaining surface-treated magnet powder 30.

Next, surface-treated magnet powder 30 of 100 parts by weight and polymer 21 of 3 parts by weight are melted and kneaded by a roll mill at 120° C. and are cooled. Thereafter, the resultant material is coarsely crushed to provide 355 μm or less, thereby providing granule 31a.

Surface-treated magnet powder 30 of 100 parts by weight, polymer 21 of 3 parts by weight, and PETE of 0.3 parts by weight are melted and kneaded by a roll mill at 120° C. and are cooled. Thereafter, the resultant material is coarsely crushed to provide 355 μm or less, thereby providing granule 31b.

Next, granule 31a of 100 parts by weight and granule 31b of 100 parts by weight are added with hardener 22 of 0.3 parts by weight. Then, the resultant material is dry-blended by a V blender to provide two types of granule-like compounds 32a and 32b. Granule-like compounds 32a and 32b are called as Example 1 and Example 2, respectively. It is noted that, in Comparison Example 14 and Comparison Example 15, magnetically-isotropic flake-like powders of 100 parts by weight, magnetically-isotropic massive powders of 100 parts by weight, and oligomer or prepolymer 20 of 3 parts by weight are subjected to a wet type mixing and solvent is vaporized. Thereafter, hardener 22 of 3 parts by weight is added and is dry-blended. The resultant mixture of 100 parts by weight is dry-blended with lubricant (calcium stearate) of 0.3 parts by weight having a particle diameter of 70 μm or less and having a melting point of 150° C., thereby providing two types of compounds 32 which are called as Comparison Example 14 and Comparison Example 15.

Figure 8:
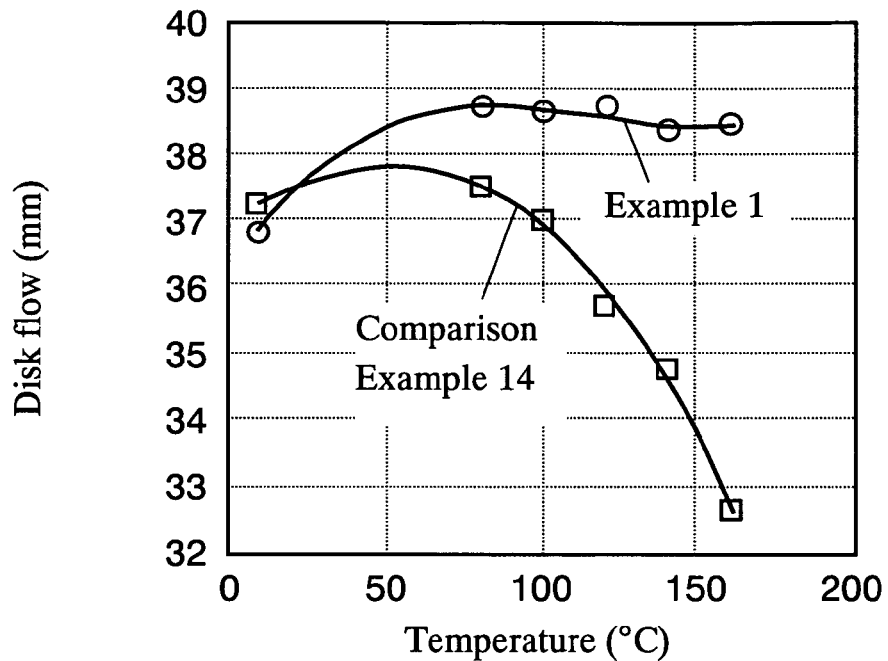
FIG. 8 illustrates a temperature dependence of a disk flow according to an embodiment of the present invention.

FIG. 8 illustrates temperature dependences of the circular disks of the compounds of Example 1 and Comparison Example 14. These flows show average values of a minor axis and a major axis of a circular disk formed in the compression of the respective granule-like compounds of 5 g with 500MPa. As this value is higher, the fluidity is higher. As is clear from FIG. 8, Comparison Example 14 shows a lower fluidity of the compound with a temperature increase. Example 1 on the other hand shows a melt flow at 80 to 160° C. equal to or higher than the melting points of oligomer or prepolymer 20 and polymer 21 and does not show the lowered flow due to a temperature increase as in Comparison Example 14. The melt flow as shown by Example 1 can be said as a viscosity-improving action by $Sm_2Fe_{17}N_3$ fine powder 13 melted and kneaded into polymer 21 of molecular weight of 4000 to 12000.

Figure 9:
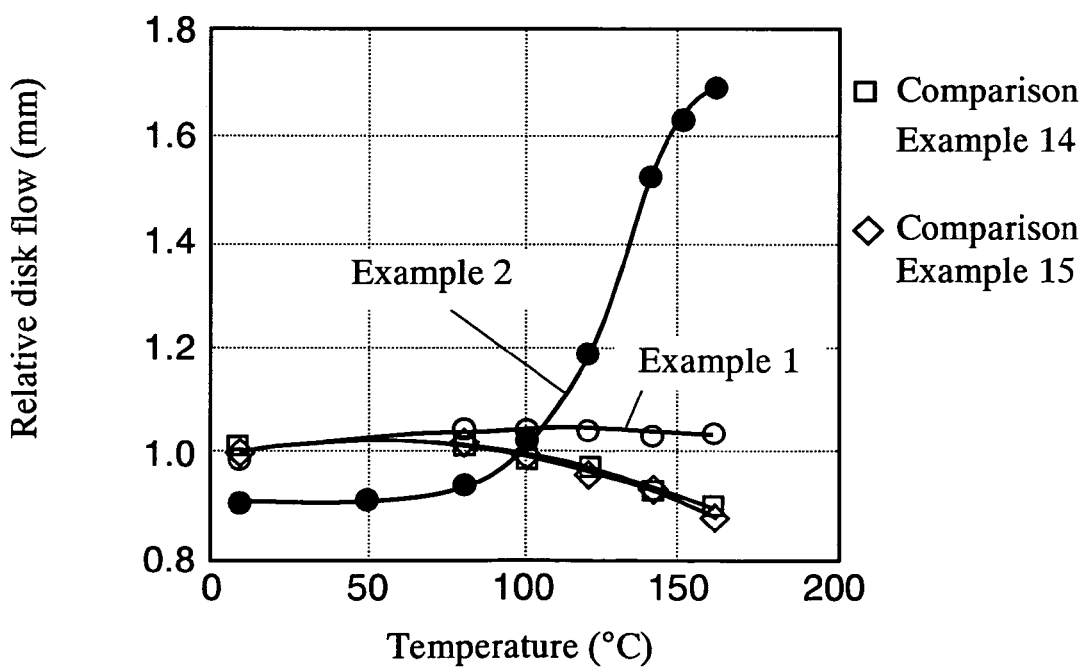
FIG. 9 illustrates a temperature dependence of a disk flow including a slip flow according to an embodiment of the present invention.

FIG. 9 illustrates temperature dependences of disk flows showing the melt flow involved with slippage of the respective compounds of Examples 1 and 2 and Comparison Examples 14 and 15. The flows are shown in normalized measurement values with measurement values of Example 1 at room temperature, the measurement values are average values of minor axis and a major axis of a circular disk formed in the compression of the respective granule-like compounds of 5 g with 50 kN.

As is clear from FIG. 9, Comparison Example 15 and Comparison Example 14 show a lowered flow of the compound with a temperature increase. Specifically, it is found that this tendency has no relation with the shape of a magnet powder such as a flake-like or massive shape. When Example 1 is compared with Example 2, a significant difference in the flow is found in a temperature range equal to or higher than the melting point of oligomer or prepolymer 20 and polymer 21 in which the melt flow is shown. When lubricant (PETE) and surface-treated magnet powder 30 and polymer 21 (polyamide) are collectively melted and kneaded as in Example 2, a timing at which compound 32b is heated and compressed causes an interface between magnet powder 10 or a forming die wall surface and polymer 21 to have dissolved lubricant, thereby providing a remarkable flow by the so-called melt flow involved with slippage that reduces the shear stress.

Figure 10:
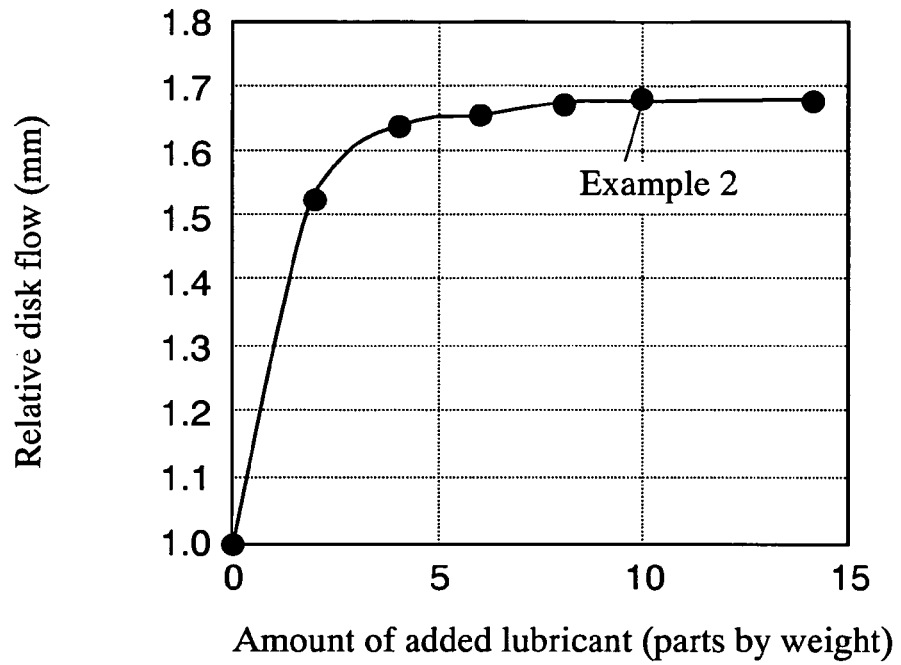
FIG. 10 illustrates a dependency of a disk flow on an amount of added lubricant according to an embodiment of the present invention.

FIG. 10 shows a relation between a compound disk flow and an addition amount of lubricant (PETE) at a temperature of 160° C. and a fixed pressure of 500 MPa. In Example 2, polymer 21 of 100 parts by weight is added with lubricant of 10 parts by weight. A case where lubricant is added in an amount of 0 (zero) corresponds to Example 1. As is clear from FIG. 10, the remarkable melt flow involved with slippage appears when polymer 21 (polyamide) of 100 parts by weight is added with lubricant (PETE) in an amount of 2 parts by weight or more. Even when the lubricant amount exceeds 10 parts by weight, an effect for further improving the flow was not observed. Thus, the lubricant amount is preferably 15 parts by weight or less.

3. Low Pressure Moldability

Figure 11:
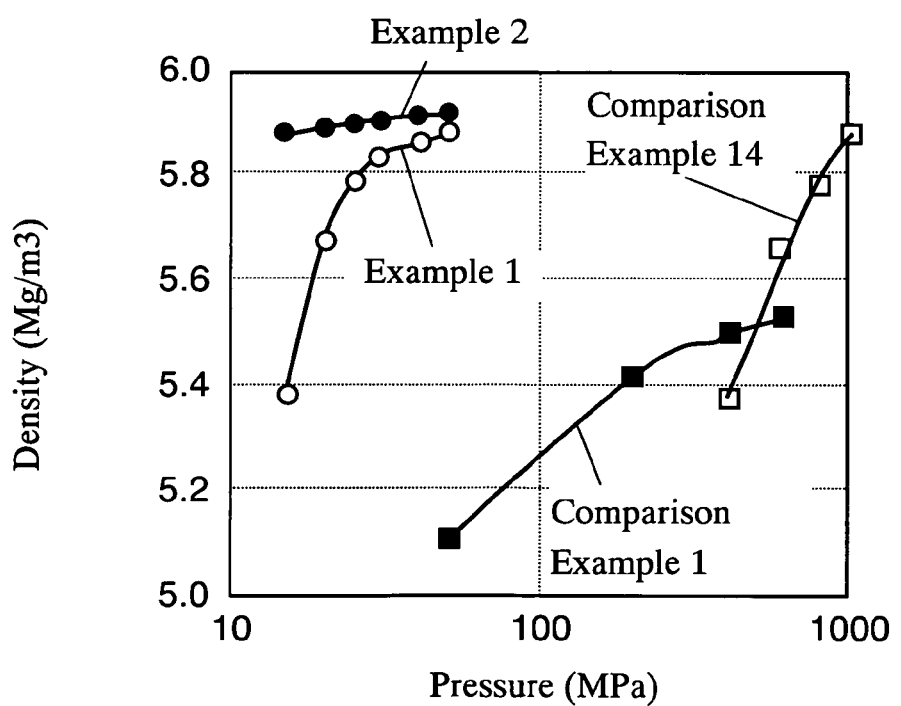
FIG. 11 is a characteristic diagram illustrating a dependency of density on a molding pressure according to an embodiment of the present invention.

FIG. 11 illustrates a relation between the density of a green compact and a molding pressure. The density was calculated by the Archimedes method. In order to obtain a predetermined density in the manufacture of a isotropic bonded magnet including a solid epoxy resin of about 3 weight percent by the powder molding, there have been a need to crush the magnet powders as in Comparison Example 14 in FIG. 11 with a pressure of about 1000 MPa and at a room temperature so as to provide a dense texture. However, when surface-treated magnet powder 30 and polymer 21 (polyamide) are collectively melted and kneaded as in Example 1 and are compressed under temperature conditions in which the melt flow characteristic appears, a green compact can be obtained at 50 MPa that has the same density as that of a green compact obtained by compressing Comparison Example 14 with 1000 MPa. It is noted that Comparison Example 1 in FIG. 11 is obtained by dry-blending surface-treated magnet powder 30 and polymer 21 without melting and kneading operations. Specifically, in order to secure a low pressure moldability, a melt flow characteristic is required and surface-treated magnet powder 30 and polymer 21 must be collectively melted and kneaded. When surface-treated magnet powder 30 is not used and when $Sm_2Fe_{17}N_3$ fine powder 13 which not being covered with oligomer or prepolymer 20 is directly melted and kneaded in particular, an affinity with polymer 21 is poor and a function as a viscosity improver cannot be obtained. This prevents the melt flow or the slip flow from appearing. In this case, the pressure dependency of the density of the green compact is substantially the same as that of Comparison Example 1 of FIG. 11 and the effect of the low-pressure compression unique to the present invention is not obtained.

It is noted that, when the lubricant and surface-treated magnet powder 30 and polymer 21 are collectively melted and kneaded as in Example 2 in FIG. 11, the slip flow appears and thus a much higher fluidity is obtained. As a result, green compact 33 having a density further higher than that of Example 1 can be obtained in an extremely low pressure range of a pressure of 15 to 50 MPa.

4. High-Speed Orientation

Figure 12:
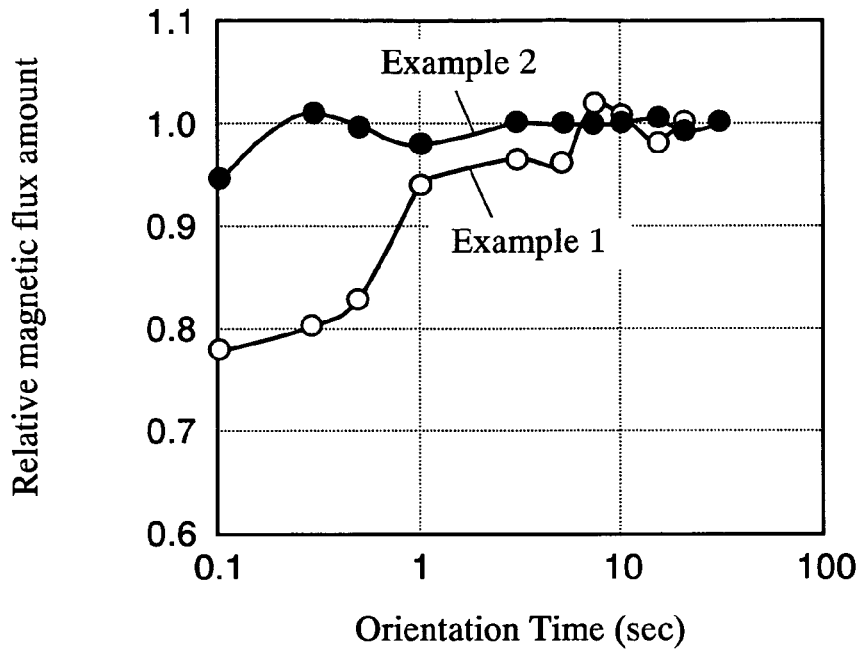
FIG. 12 illustrates a dependency of a magnetic flux amount of magnet powders on the orientation time according to an embodiment of the present invention.

FIG. 12 shows the dependency of the magnetic flux amount of magnet powder 10 on an orientation time. In FIG. 12, green compact 33 having a thickness of 1 mm is used as a sample that is manufactured by using a square cavity having a width of 6 mm and a length of 60 mm under conditions of a temperature of 140 to 150° C., an orthogonal orientation magnetic field of 1.5 MA/m, and a pressure of 30 MPa. The value of the relative magnetic flux amount in the longitudinal axis is obtained by subjecting green compact 33 as a sample to a pulse magnetization at 4 MA/m in the orientation direction and normalizing the result based on the magnetic flux amount in the orientation time of 30 seconds measured by a magnetic fluxmeter.

In Example 2 in which lubricant and surface-treated magnet powder 30 and polymer 21 are collectively melted and kneaded, a remarkable slip flow is caused in a status in which oligomer or prepolymer 20, polymer 21, hardener 22, and the lubricant are melted. This phenomenon means an apparent decline of the melt viscosity. In other words, this phenomenon not only reduces the shear stress between polymer 21 and the forming die wall surface but also provides a lubricating action to an interface between polymer 21 and magnet powder 10. As in Example 2, the slip flow also provides an effect that shortens, when compared with Example 1 showing only the melt flow, the orientation time of magnet powder 10.

Figure 13:
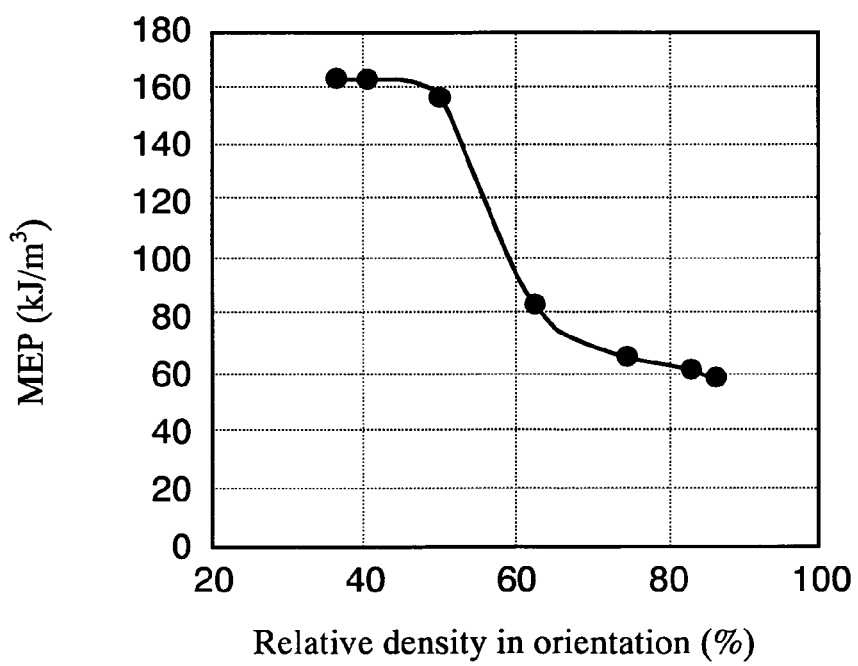
FIG. 13 illustrates the relation between a relative density during the orientation and MEP according to an embodiment of the present invention.

FIG. 13 shows a relation between the relative density of the compound of Example 2 and MEP obtained when the green compact compressed with 30 MPa is subsequently magnetized in a direction along which a pulse magnetic field of 4 MA/m is applied for an anisotropic action. In FIG. 12, an apparent density of the compound of Example 2 is 2.46 $Mg/m^3$. The relative density is represented by a rate to a true density including magnet powder 10, oligomer or prepolymer 20, polymer 21, hardener 22, and lubricant. As is clear from FIG. 12, an allowable relative density of a compound in a forming die cavity for an application of an orientation magnetic field is substantially 50% and such an allowable relative density of 50% or less provides an MEP of 160 kJ/m$^3$ or more. When the relative density exceeds 50% on the other hand, rare earth magnet powder 10 is difficult to be oriented, causing a rapid decline of MEP. As described above, the relative density of the compound for an application with an orientation magnetic field must be 50% or less.

5. Form of Green Compact

Figure 14:
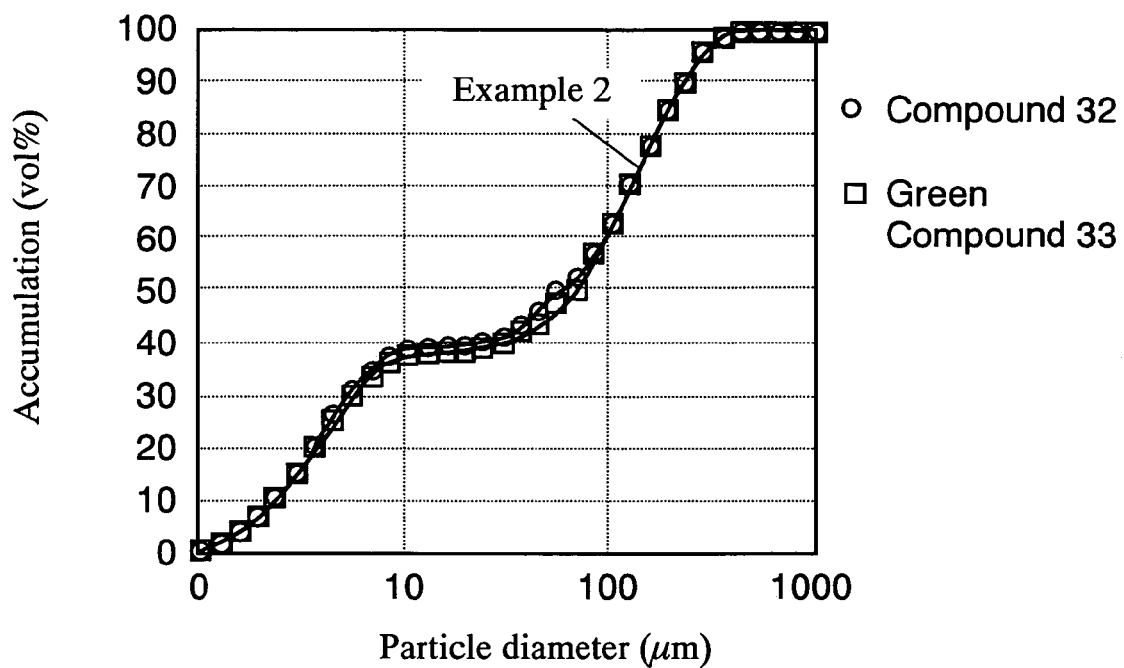
FIG. 14 shows a change in the particle size distribution of magnet powders according to an embodiment of the present invention.

FIG. 14 shows a change in the particle size distribution of magnet powder 10 in a low pressure molding. The particle size distribution was measured based on the following method. Specifically, the compound in Example 2 was used to manufacture a green compact having a thickness of 1 mm under conditions of a temperature of 140 to 150° C., a parallel orientation magnetic field of 1.4 MA/m, and a pressure of 30 MPa and using a SUS304-made square cavity that is composed of upper and lower punches and a die and that has a width of 6 mm and a length of 60 mm.

Next, oligomer or prepolymer 20, polymer 21, hardener 22, and lubricant included in the above compound and green compact are removed by solvent. Thereafter, with regards to magnet powder 10 (in which a rate between $Nd_2Fe_{14}B$ powder 11 and $Sm_2Fe_{17}N_3$ fine powder 13 is 6:4), the particle size distribution is measured by a laser diffraction-type particle size distribution meter.

As is clear from FIG. 14, the particle size distributions of magnet powders before and after the molding operation are almost the same and show substantially no change. As is clear from this, the dense texture involved with the melt flow (slip flow) of polymer 21 having an increased viscosity by $Sm_2Fe_{17}N_3$ fine powder 13 and a buffering action in a space of $Nd_2Fe_{14}B$ powder 11 suppress, in the operation providing the dense texture by the compression pressure, magnet powder 10 and polycrystalline aggregate-type $Nd_2Fe_{14}B$ powder 11 in particular from being broken or having a damaged surface.

Figure 15:
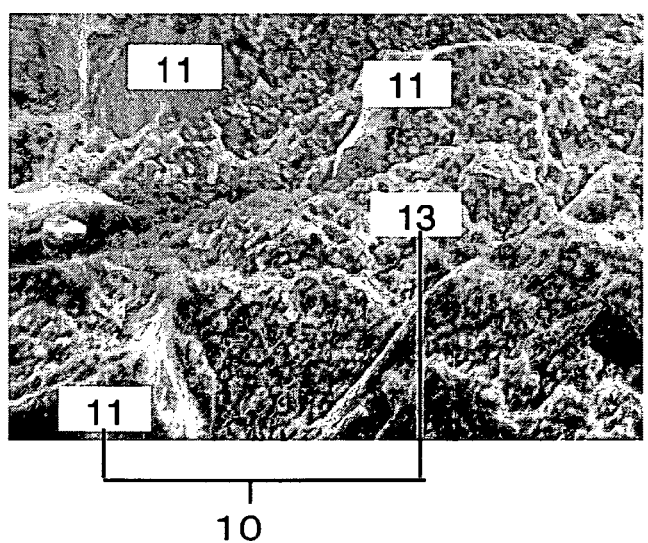
FIG. 15 is a SEM photograph illustrating a fracture cross section of an embodiment of the present invention.

FIG. 15 shows a SEM photograph showing a fracture cross section of green compact 33 of the present invention in which polycrystalline aggregate-type $Nd_2Fe_{14}B$ powder 11 and single domain particle-type $Sm_2Fe_{17}N_3$ fine powder 13 are shown. $Sm_2Fe_{17}N_3$ fine powder 13 has a continuous phase consisting of fine particles around $Nd_2Fe_{14}B$ powder 11. As is clear from FIG. 15, the melt flow (slip flow) of polymer 21 having an increased viscosity by $Sm_2Fe_{17}N_3$ fine powder 13 and the buffering action in a space of $Nd_2Fe_{14}B$ powder 11 suppress $Nd_2Fe_{14}B$ powder 11 from being broken or damaged. The suppression of the breakage or surface damage of $Nd_2Fe_{14}B$ powder 11 as described above suppresses the decline of the squareness property ($Hk/H_{CJ}$) of the demagnetization curve corresponding to the permanent deterioration of the powder or an increase of the irreversible demagnetization rate. Specifically, the thermostability of the magnet is improved.

It is noted that, when assuming that the density of green compact 33 calculated by the Archimedes method is 5.92 Mg/m$^3$ and a theoretical density including a resin component is 5.976 Mg/m$^3$, the relative density was 99.06%. However, the theoretical density of the green compact was calculated based on the following density values of the respective components. Specifically, this calculation was based on 7.55 Mg/m$^3$ for $Nd_2Fe_{14}B$ powder 11, 7.6 Mg/m$^3$ for $Sm_2Fe_{17}N_3$ fine powder 13, and 1.02 Mg/m$^3$ for a resin component. As described above, when green compact 33 of Example 2 is compared with a conventional isotropic $Nd_2Fe_{14}B$ bonded magnet by the compression molding, a green compact compressed with a high density having substantially no space can be provided at a low pressure of 30 MPa while minimizing the breakage or damage to the magnet powders. Furthermore, the low pressure of 30 MPa allows a compression forming die such as upper and lower punches and a die to use, not a nonmagnetic cemented carbide but a low-cost nonmagnetic material such as SUS304. Specifically, the present invention can provide a manufacture method having a high productivity.

6. Self-Organization

Self-organized bonded magnet 34 was manufactured by using compound 32 of Example 2 to manufacture, with a temperature of 140 to 150° C., orthogonal orientation magnetic field of 1.4 MA/m, and a pressure of 30 MPa, green compact 33 having a thickness of 1 mm by a square cavity having a width of 6 mm and a length of 60 mm and composed of SUS304-made upper and lower punches and a die to subsequently heat green compact 33 in air for 20 minutes.

Figure 16:
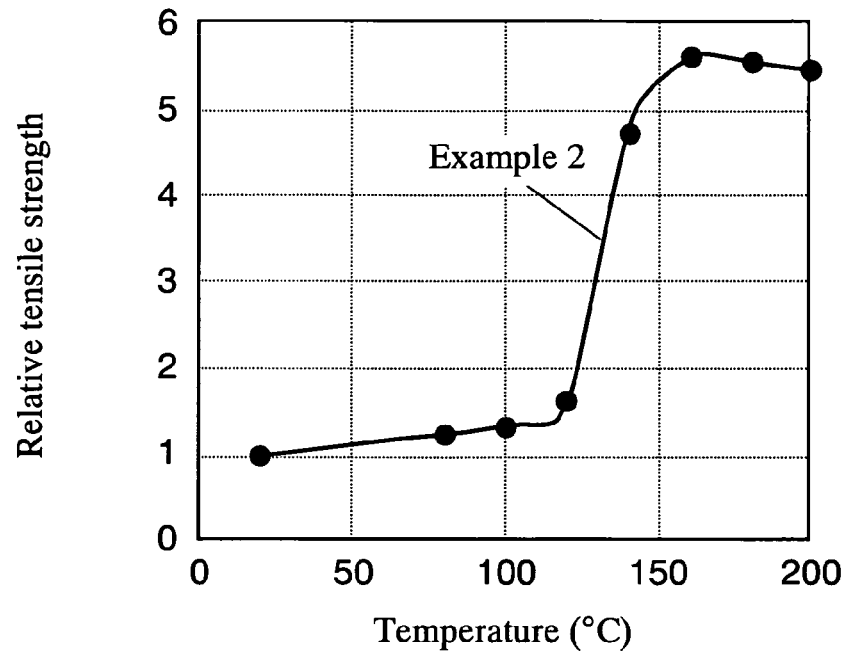
FIG. 16 illustrates a dependency of a tensile strength on a heating temperature of an embodiment of the present invention.

FIG. 16 shows the heating temperature dependence of a relative tensile strength when green compact 33 is heated in air for 20 minutes. The relative tensile strength is a value normalized based on the tensile strength at 20° C. of green compact 33 not heated.

As is clear from FIG. 16, when the temperature exceeds 120° C., the tensile strength rapidly increases and is substantially constant at 160° C. Thus, the molding temperature of green compact 33 of the present invention using the melt flow (slip flow) is preferably equal to or higher than the melting points of oligomer or prepolymer 20, polymer 21, hardener 22, and lubricant and is equal to or lower than 160° C. Then, an optimal temperature of the self-organization by the reaction between the resin component (which refers to oligomer or prepolymer 20 and polymer 21) and hardener 22 is found to be in a range from 150 to 160° C. It is noted that self-organized bonded magnet 34 in this case has a chemical structure that is estimated as shown in FIG. 5. Bonded magnet 34 showed a tensile strength that was about 5.5 times higher than that of green compact 33 and an absolute value after the heating with 160° C. for 20 minutes was 17.6 MPa.

It is noted that PETE as lubricant is considered to lower, as in general unreactive plasticizer, the mechanical strength of the bonded magnet. However, green compact not including PETE of Example 1 actually has an absolute value of the tensile strength of 18.3 MPa after the heating at 160° C. for 20 minutes. Specifically, the difference from Example 2 is only a few percent.

The reason is estimated that PETE as lubricant of the present invention comes out of a system of polymer 21 to reduce the amount of PETE remaining in green compact 33. PETE coming out from the system of polymer 21 as described above is considered to reduce the shear stress at the boundary surface to the mold wall surface or the magnet powder. It is noted that these tensile strength levels are all equal to or higher than 15 MPa and thus correspond to a level about three times higher than the tensile strength of a known ferrite rubber bonded magnet.

By the self-organization by the reaction between oligomer or prepolymer 20 or polymer 21 and hardener 22 as described above, the epoxy resin hardened material as a reaction product between component oligomer or prepolymer 20 and hardener 22 strongly fixes magnet powder 10. Furthermore, polymer 21 reacting with them improves the moisture resistance and heat resistance and stretches to provide flexibility to the entirety of bonded magnet 34.

7. Shape Transformation

The compound of Example 2 is used to manufacture a green compact under conditions of a temperature of 140 to 150° C., an orthogonal orientation magnetic field of 1.4 MA/m, and a pressure of 30 MPa and by a SUS304-made square cavity having a width of 6 mm, and a length of 60 mm and composed of upper and lower punches and a die. Next, the green compact is heated at 160° C. for 20 minutes to provide self-organized bonded magnet 34 having a thickness of 0.4 to 2.5 mm.

Figure 17:
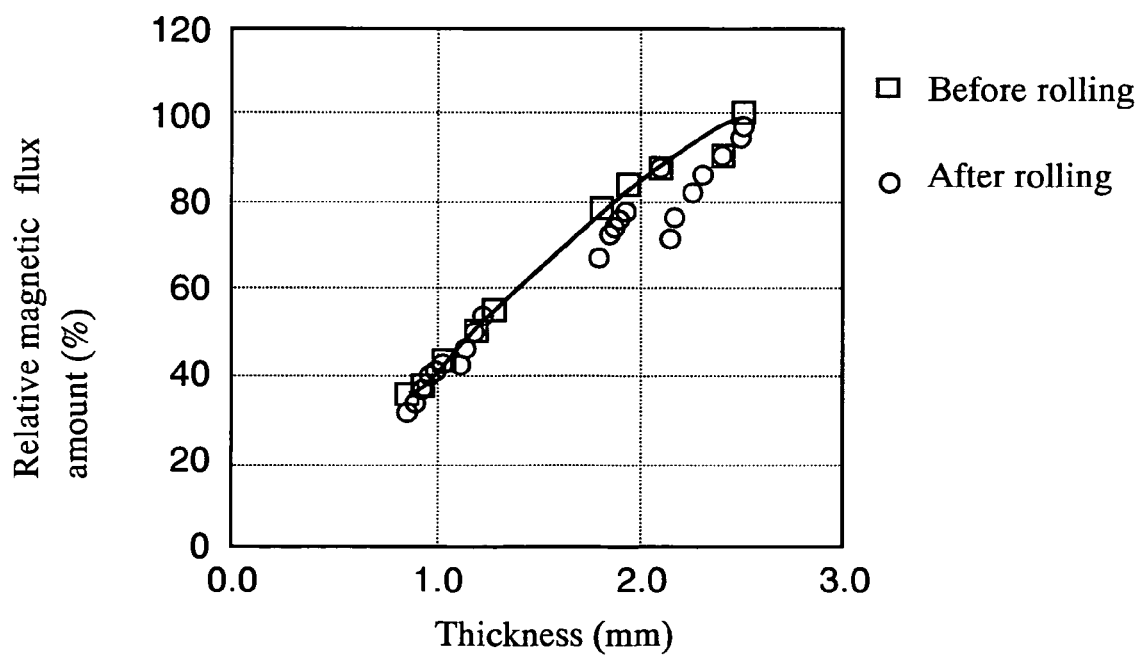
FIG. 17 illustrates the change in a surface magnetic flux due to rolling operation in an embodiment of the present invention.

FIG. 17 is a plot showing a change of the magnetic flux amount by the rolling (Y axis) with regards to the thickness (X axis) when bonded magnet 34 is previously magnetized with a pulse magnetic field of 4 MA/m and is subjected to a constant-velocity rolling. The magnetic flux amount is represented as a relative magnetic flux amount normalized based on the magnetic flux amount of the magnet having a thickness of 2.5 mm before subjected to the rolling.

In FIG. 17, the square mark represents a magnetic flux amount before the rolling operation and the circular mark represents a magnetic flux amount after the rolling operation. The regression curve represents a relation between the magnet thickness and the relative magnetic flux amount before the rolling operation. As is clear from FIG. 17, the relative magnetic flux amount of the magnet having the thickness of 2.1 to 2.5 mm significantly decreases due to a small reduction of the thickness by a rolling operation. When this decrease is compared with the regression curve of the magnetic flux amount with regards to the thickness of the bonded magnet without being rolled, this decrease clearly means the reduction of the relative magnetic flux amount due to the reduction of a disturbed orientation of magnet powder 10 by a rolling operation. In contrast with this, the plot of the magnetic flux amount of the bonded magnet having a thickness of about 1.3 mm after the rolling operation is substantially the same as the regression curve of the magnetic flux amount to the thickness of the bonded magnet without being rolled. Thus, the decrease of the magnetic flux amount due to the disturbed orientation by the rolling operation of magnet powder 10 in this case is not clearly measured. In other words, self-organized bonded magnet 34 of the present invention having a thickness of about 1 to 2 mm can suppress the decrease of the magnetic flux amount due to the disturbed orientation by a rolling operation to a level that can be substantially ignored.

For example, when the radial orientation magnetic field is reduced due to a circular magnet having a smaller diameter and a longer length, magnet powder 10 always has a declined orientation degree. Thus, this case inevitably causes the reduced MEP of the bonded magnet. Specifically, only a radially-anisotropic circular magnet can be manufactured in this case that has a MEP much lower than that of a bonded magnet that is manufactured to have a cylindrical column or cube-like shape and that has a high MEP. However, the present invention can solve the above problem.

8. Assembly of Magnetic Circuit

The compound of Example 2 is applied with a parallel orientation magnetic field of 1.4 MA/m in a temperature of 140 to 150° C. with a SUS304-made square cavity that has a width of 25 mm and a length of 160 mm and that is composed of upper and lower punches and a die and with a compound in the cavity having a relative density of 41% and being retained for 0.5 second and is then applied with a pressure of 25 MPa under conditions of the melt flow involved with slippage. In this manner, green compact 33 was manufactured that is anisotropic in the perpendicular direction in a surface having a thickness of 1.05 mm. Furthermore, green compact 33 was heated at 160° C. for 20 minutes to provide self-organized bonded magnet 34 having a density of 5.87 Mg/m³ (relative density of 98.3%), a width of 25 mm, a length of 160 mm, and a thickness of 1.05 mm. After the magnetization of self-organized bonded magnet 34 with a pulse magnetic field of 4 MA/m, the magnetic characteristic was a residual magnetization Jr of 0.99 T, a coercivity $H_{CJ}$ of 955 kA/m, and a MEP of 164 kJ/m³.

By the way, when a powder molding machine or the like is used to subject magnet powder 10 mixed with a few percent of epoxy resin to a compression molding, these materials must be equally filled into a forming die cavity. The reason is that, when the filled material in the cavity is fluctuated, fluctuation of the density or size is caused, causing variation of MEP. In order to mold a magnet of a thickness of 1.05 mm by the shown forming die cavity having a width of 25 mm and a length of 160 mm in particular, a sophisticated filling accuracy is required, which causes a difficulty in an actual industrial production. However, the present invention provides a low pressure molding under conditions of the melt flow involved with slippage and thus can manufacture a plate-like green compact having an equal size and density, even when the filling fluctuation is caused to a certain level. Specifically, the present invention can provide a manufacture method that is advantageous in an industrial production.

Figure 18:
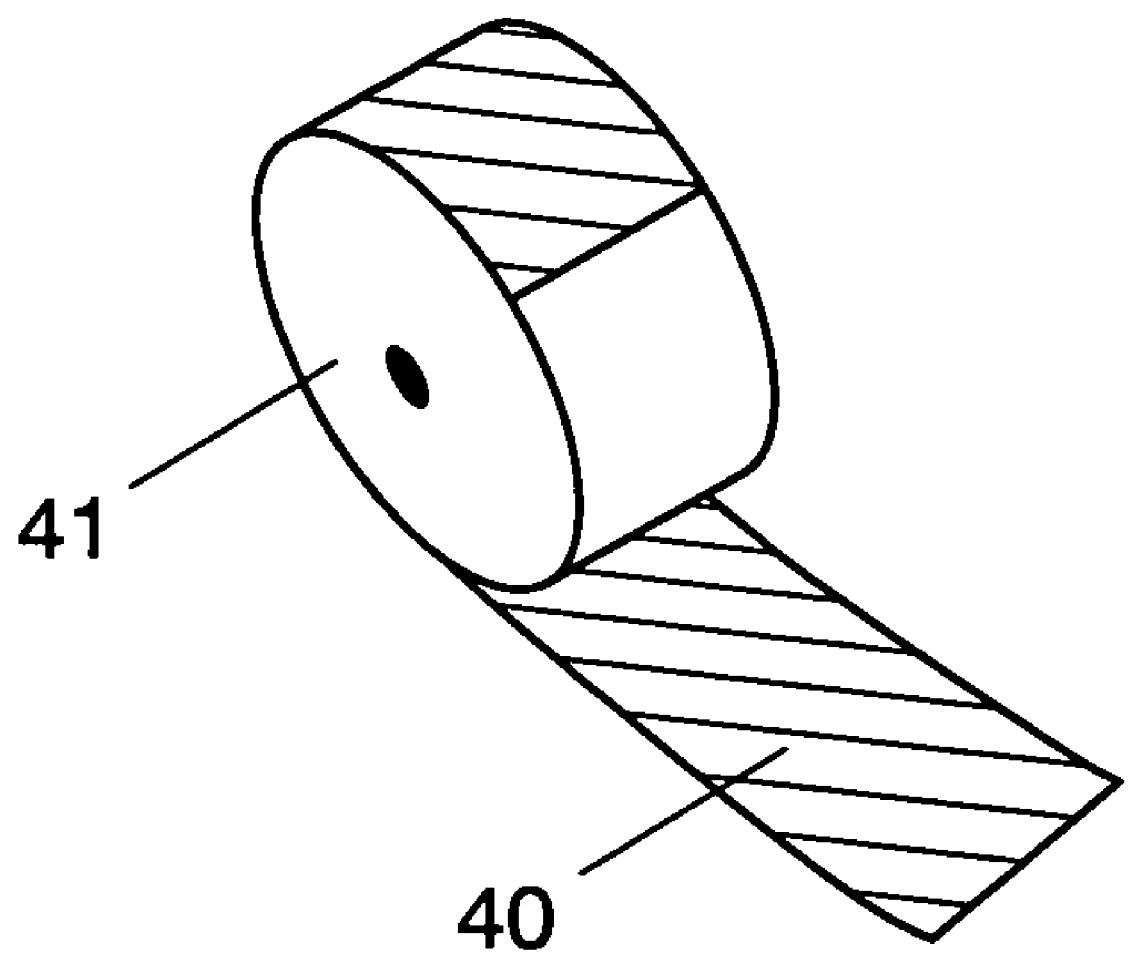
FIG. 18 is a perspective view illustrating an example of an appearance of an assembly of a magnetic circuit of an embodiment of the present invention.

Plate-like bonded magnet 34 having a MEP of 164 kJ/m³, a width of 25 mm, a length of 160 mm, and a thickness of 1.05 mm as described above was rolled to have a thickness of 1.02 mm and to have flexibility. FIG. 18 is a perspective view showing an appearance of rolled bonded magnet 40 wound around layered magnetic steel sheet 41 having an outer diameter of 48 mm and a layer thickness of 25 mm. As is clear from FIG. 18, bonded magnet 34 has flexibility by the rolling operation appearing in the rolling direction (longitudinal direction in this case). This is a result obtained by stretching polymer 21 in one axial direction and in the rolling direction. In this manner, a radially-anisotropic circular bonded magnet having a MEP of 164 kJ/m³ can be manufactured regardless of the diameter of the magnet.

It is noted that, when the above magnet was magnetized with 1.2 MA/m, the MEP at 20° C. was about 120 kJ/m³ and, when the above magnet was magnetized with 2.0 MA/m, the MEP exceeded 160 kJ/m³.

On the other hand, when a general isotropic $Nd_2Fe_{14}B$ bonded magnet having a MEP at the magnetization with 2.0 MA/m of 80 kJ/m³ was magnetized with 1.2 MA/m, the MEP at 20° C. was about 60 kJ/m³. Thus, at least 1.2 MA/m of magnetization force is required for allowing the bonded magnet of the present invention to have MEP that is about two times higher than an isotropic $Nd_2Fe_{14}B$ bonded magnet under the same magnetization conditions.

When polymer 21 is stretched by the stamping method, self-organized bonded magnet 34 of the present invention can be subjected to shape transformation to a circular arc-like shape. When self-organized bonded magnet 34 of the present invention is provided as a circular arc-like bonded magnet that has the maximum thickness of 1 mm or less and that has unequal thicknesses in particular, the motor performance can be improved while suppressing a cogging torque.

Figure 7D:
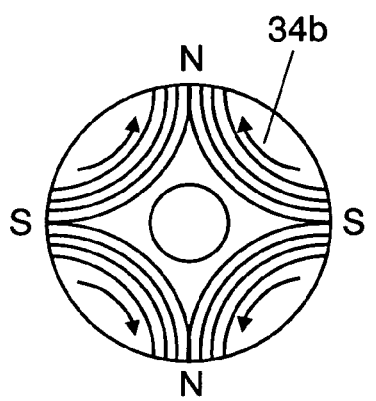
FIG. 7D illustrates a magnetization direction and a shape transformation of a bonded magnet according to an embodiment of the present invention.

On the other hand, green compact 33 is obtained by causing compound 32b of Example 2 to be anisotropic in the in-plane direction under conditions of a temperature of 140 to 150° C., an orthogonal orientation magnetic field of 1.4 MA/m, and a pressure 25 MPa and by a SUS304-made square cavity having a width of 6 mm and a length of 60 mm and composed of upper and lower punches and a die. Next, green compact 33 is heated at 160° C. for 20 minutes to provide self-organized bonded magnet 34 having a density of 5.84 Mg/m³ (relative density 98%), a length of 160 mm, and a width of 25 mm. Magnet 34 being anisotropic in the in-plane direction thus obtained is magnetized with a pulse magnetic field of 4 MA/m. The magnetic characteristic after the magnetization showed residual magnetization Jr of 0.97 T, coercitivity HCJ of 965 kA/m, and MEP of 161 kJ/m³. Thus, bonded magnet 34 can have MEP of 160 kJ/m³ or more regardless of the anisotropic direction perpendicular to the plane or in the in-plane direction. Thus, the present invention can cope with various magnetic circuits having a permanent magnet magnetic field system as shown in FIG. 7B to FIG. 7D obtained by subjecting a magnet anisotropic in the in-plane direction to shape transformation.

According to the present invention, self-organized bonded magnet 34 is manufactured by using $Sm_2Fe_{17}N_3$ fine powder 13 to increase the viscosity of stretchable polymer 21 to provide a melt flow (slip flow) property to compound 32 to use the low pressure moldability under conditions in which the melt flow appears. The low-pressure compression molding under the conditions of melt flow (slip flow) provides the following three effects.

1. The dense texture by the flow can provide, with a compression pressure of 25 to 50 MPa, green compact 33 that is densely compressed to have a relative density of 98% or more. This pressure level is similar to that of a general plastic molding (injection molding) and is substantially 1/10 to 1/20 smaller than a molding pressure of an isotropic bonded magnet of 500 to 1000 MPa. Thus, nonmagnetic material (e.g., SUS304) that has a lower cost than that of cemented carbide can be used for a forming die.
2. A melt flow involved with a slip flow allows magnet powder 10 to be oriented with a high-speed. This suppresses the orientation from being mechanically disturbed by the compression. Thus, self-organized bonded magnet 34 can be manufactured by causing a plate-like magnet to be anisotropic in a direction perpendicular to the plane or in the in-plane direction.
3. By the relative density of 98% or more, reduction of MEP corresponding to a permanent deterioration of polycrystalline aggregate-type $Nd_2Fe_{14}B$ powder 11 due to the oxidation during a heat processing in air can be ignored. Thus, self-organized bonded magnet 34 having a superior thermostability and having MEP of 160 k J/m³ or more can be manufactured.

As described above, by applying the self-organized bonded magnet having a high MEP according to the present invention to a small motor, many requirements to electric and electronic devices for a higher performance can be satisfied such as power saving by a higher output, a smaller size, and a lighter weight.

INDUSTRIAL APPLICABILITY

The bonded magnet of the present invention can be applied to a permanent magnet rotor-type or permanent magnet magnetic field system-type brushless motor or a DC motor. The bonded magnet of the present invention can be widely used for controlling and driving computer peripheral devices and printers.

The invention claimed is:
1. A method for manufacturing a rare earth-iron bonded magnet comprising:
   a first step of covering a rare earth-iron magnet powder with oligomer or prepolymer to provide a surface-treated magnet powder, wherein the oligomer or prepolymer has a functional group for fixing the rare earth-iron magnet powder;
   a second step of melting a stretchable polymer and kneading the melted stretchable polymer with the surface-treated magnet powder at a temperature equal to or higher than a melting point of the polymer to coarsely crush a resultant material to provide a granule;
   a third step of dry blending an additive and a hardener with the granule to provide a compound;
   a fourth step of compressing the compound under conditions in which the oligomer or prepolymer, the polymer, and the hardener are heated to melt and to flow at a temperature equal to or higher than the melting points of the oligomer or prepolymer, the polymer, and the hardener to provide a green compact; and
   a fifth step of stretching the rare earth-iron bonded magnet to transform the shape to any of a circular-shape or a circular arc-like shape.

2. The method according to claim 1, wherein a compression pressure in the fourth step is 50 MPa or less.

3. The method according to claim 1, wherein the second step simultaneously melts the stretchable polymer and kneads the melted stretchable polymer and the surface-treated magnet powder together with a lubricant to coarsely crush the resultant material to provide the granule.

4. The method according to claim 3, wherein the lubricant is pentaerythritol C17 triester and is added to in an amount of 3 to 15 parts by weight to the polymer of 100 parts by weight.

5. The method according to claim 3, wherein the fourth step heats the compound with a temperature equal to or higher than melting points of the oligomer or prepolymer, the stretchable polymer, the hardener, and the lubricant to compress the compound with a pressure of 15 to 50 MPa to provide the green compact.

6. The method according to claim 1, wherein the rare earth-iron magnet powders have magnetically-anisotropic polycrystalline aggregate-type $Nd_2Fe_{14}B$ powders having an average particle diameter of 50 μm or more and magnetically-anisotropic single domain particle-type $Sm_2Fe_{17}N_3$ fine powders having an average particle diameter of 3 μm or less.

7. The method according to claim 6, wherein the rare earth-iron magnet powders include the single domain particle-type $Sm_2Fe_{17}N_3$ fine powders with a proportion of 40% weight or more.

8. The method according to claim 1, wherein the oligomer or prepolymer includes at least one type of epoxy compound that has an oxirane ring and that has a melting point in a range from 70 to 100° C.

9. The method according to claim 1, wherein the stretchable polymer is polyamide resin having a melting point in a range from 80 to 150° C.

10. The method according to claim 1, wherein the hardener is a powdery latent hardener consisting of hydantoin derivative.

11. The method according to claim 1, wherein the third step dry-blends the, the hardener and the granule together with catalyst as an additive agent.

12. The method according to claim 1, wherein the compound includes the rare earth-iron magnet powders in an amount of 95 weight percent or more.

13. The method according to claim 5, wherein the fourth step heats the compound filled in a forming die cavity to subsequently subject the compound to a compression molding under an orientation magnetic field of 1 MA/m or more and with a pressure of 25 to 50 MPa.

14. The method according to claim 13, wherein the application of the orientation magnetic field is performed with the green compact having a relative density or 50% or less.

15. The method according to claim 13, wherein the green compact has a plate-like shape having a thickness of 1.5 mm or less that is obtained by subjecting the rare earth-iron magnet powders to a compression molding while orientating the rare earth-iron magnet powders in the thickness direction with a parallel magnetic field of 1 MA/m or more that is parallel to a plane of the green compact so that the green compact is anisotropic in a direction perpendicular to the plane.

16. The method according to claim 13, wherein the green compact has a plate-like shape having a thickness of 1.5 mm or less that is obtained by subjecting the rare earth-iron magnet powders to a compression molding while orientating the rare earth-iron magnet powders in the thickness direction with a transverse magnetic field of 1 MA/m or more that is transverse to a plane of the green compact so that the green compact is anisotropic in an in-plane direction.

17. The method according to claim 1, wherein the fourth step manufactures the green compact with a compression forming die composed of nonmagnetic material having a plurality of cavities.

18. The method according to claim 17, wherein the compression forming die is made of nonmagnetic material.

19. The method according to claim 1, wherein the green compact has a relative density of 98% or more.

20. The method according to claim 1, wherein the compressing and heating by the fourth step provide the rare earth-iron bonded magnet with a relative density of 98% or more.

21. The method according to claim 1, wherein the fifth step stretches the rare earth-iron bonded magnet by rolling the rare earth-iron bonded magnet to transform the shape to a circular shape.

22. The method according to claim 1, wherein the fifth step stretches the rare earth-iron bonded magnet by stamping the rare earth-iron bonded magnet to transform the shape to a circular arc-like shape.

23. The method according to claim 21 wherein the rare earth-iron bonded magnet has the maximum energy product at 20° C. of 120 kJ/m$^3$ or more when being magnetized at 1.2 MA/m.

24. The method according to claim 21, wherein the rare earth-iron bonded magnet has the maximum energy product at 20° C. of 160 kJ/m$^3$ or more when being magnetized at 2.0 MA/m.

25. A motor including the circular, and rare earth-iron bonded magnet obtained by the manufacture method according to claim 21.

26. A motor including the circular, and rare earth-iron bonded magnet obtained by the manufacture method according to claim 22.

27. A motor having a magnetic field system that consists of the rare earth-iron bonded magnet anisotropic in a direction perpendicular to the plane according to claim 15.

28. The method according to claim 22, wherein the rare earth-iron bonded magnet has the maximum energy product at 20° C. of 120 kJ/m$^3$ or more when being magnetized at 1.2 MA/m.

29. The method according to claim 22, wherein the rare earth-iron bonded magnet has the maximum energy product at 20° C. of 160 kJ/m$^3$ or more when being magnetized at 2.0 MA/m.

30. A motor having a magnetic field system that consists of the rare earth-iron bonded magnet anisotropic in the in-plane direction according to claim 16.

* * * * *